United States Patent [19]

Tang et al.

[11] 3,973,219
[45] Aug. 3, 1976

[54] VERY RAPIDLY TUNED CW DYE LASER

[75] Inventors: Chung L. Tang; John Martin Telle, both of Ithaca, N.Y.

[73] Assignee: Cornell Research Foundation, Inc., Ithaca, N.Y.

[22] Filed: Apr. 24, 1975

[21] Appl. No.: 571,341

[52] U.S. Cl. .................. 331/94.5 C; 331/94.5 L
[51] Int. Cl.² ........................................ H01S 3/10
[58] Field of Search.................. 331/94.5; 332/7.51

[56] References Cited
UNITED STATES PATENTS
3,648,193  3/1972  Foster et al. .................... 331/94.5

Primary Examiner—William L. Sikes
Attorney, Agent, or Firm—Theodore C. Wood; Ralph R. Barnard; Lawrence E. Laubscher

[57] ABSTRACT

A method and apparatus is described which allows a cw dye laser to be tuned over hundreds of angstroms on a nanosecond time scale in spite of the relatively long cavity decay and build up time. A tuning element is positioned at the mid-point between the reflective mirrors that define the length of the cavity.

4 Claims, 2 Drawing Figures

VERY RAPIDLY TUNED CW DYE LASER

The Government has rights in this invention pursuant to Grant No. GK-33848 awarded by the National Science Foundation.

BACKGROUND OF THE INVENTION

Rapid tuning of a laser by use of electro-optical or acusto-optical techniques has been heretofore known. The article in Applied Physics Letters Vol. 24, No. 2, pp 85–87 (1974) by J. M. Telle and C. L. Tang discloses a laser tuner of the electro-optical type which is not only rapid but also permits tuning over a broad tuning range. Because the cavity decay time, in particular for the cw Dye Laser, is on the order of 100 nsec. and because the cavity buildup time from the spontaneous emission power level is also on this order, it was heretofore believed impossible to tune the laser over a significant wavelength range in a time less than about 0.1 $\mu$sec. Many potential applications (e.g. optical pulse compression and time-resolved spectroscopy) demand wavelength scanning in a time much less than 0.1 $\mu$sec.; therefore, electronically tunable lasers heretofore were not considered for such use.

SUMMARY OF THE INVENTION

A method and apparatus causes the wavelength of the lightwave propogating back and forth inside the laser cavity to change continuously spatially and thereby permit a tuning rate orders of magnitude larger than previously thought possible.

DETAILED DESCRIPTION

Figure 1:
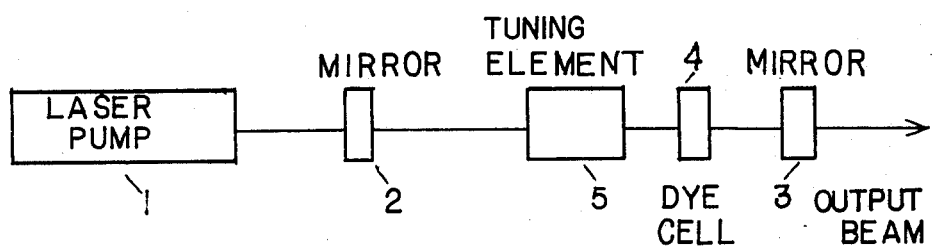
FIG. 1 is a block diagram of a tunable laser having tuning apparatus in accordance with this invention.

FIG. 1 is a schematic diagram in simplified block form, of a tunable dye laser including a laser light source 1, mirrors 2, 3 defining a cavity, a dye cell 4, and a tuning element 5 located at the mid-point of the cavity. The tuning element 5 is preferably of the type described in the previously mentioned Applied Physics Letters article but may be of any suitable type capable of rapid tuning over a broad band.

In FIG. 1, the optical length of the cavity ($L$) in centimeters is:

$$L = c/f$$

where $c$ is the velocity of light in cm/sec (e.g. $3 \times 10^{10}$) and $f$ is the tuning frequency in cps. For example, for a tuning rate of $10^8$ cps (10 nsec.) the optical length of the cavity is 3 meters.

Figure 2:
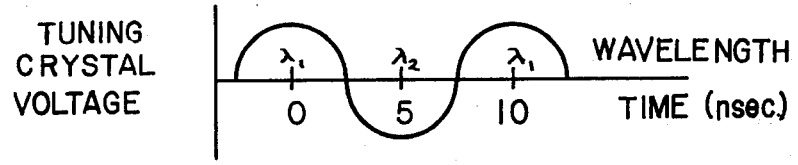
FIG. 2 is a schematic diagram which illustrates the timing relationships between the tuning crystal voltage and light wavelength within the laser cavity.
Figure 2:
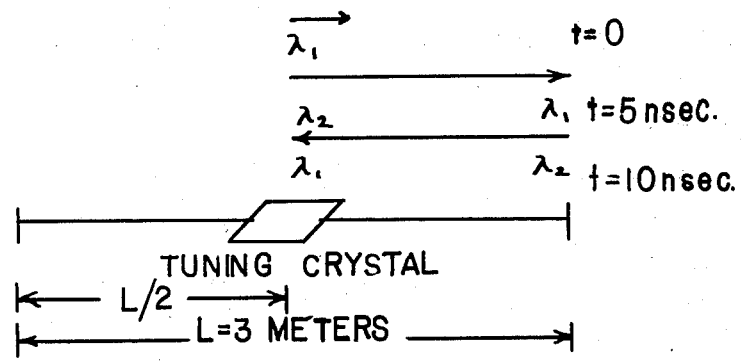

Referring now to FIG. 2, there is illustrated a 3 meter length cavity with a tuning rate of $10^8$ cps (10 nsec.) to aid in describing the operation of the tunable dye laser. At the top of this figure, the tuning crystal voltage versus time is plotted. Along and above the time axis is also plotted the wavelength of the laser light moving through the crystal tuner at the corresponding time shown. In the lower half of the figure a sequence of events taking place inside the laser cavity, and the corresponding times which they occur are shown.

FIG. 2 shows that at $t=0$ the voltage on the crystal is a maximum and the wavelength of the radiation moving through the tuner is $\lambda_1$. As $t$ changes from 0 to 5 nsec. the voltage on the crystal tuner changes from a maximum to a minimum and thus the wavelength which has a maximum transmission through the tuner will change; for example to $\lambda_2$. During this same time $\lambda_1$ will travel to the right hand mirror. During the next 5 nsec. interval, $\lambda_1$ will move back to the crystal tuner and the voltage will change back to its maximum value; the value for which the tuner has a maximum transmission for the wavelength $\lambda_1$. Thus a steady state will ensue where the laser tunes from $\lambda_1$ to $\lambda_2$ in 5 nsec. and from $\lambda_2$ and $\lambda_1$ in the next 5 nsec. In short, the key difference between this mode of operation and previous lasers is that the wavelength of the light wave propogating back and forth inside the cavity changes continuously spatially. This leads to a continuous periodic modulation of the wavelength of the laser emission, with each period equal to the round trip time inside the cavity, and to a tuning rate ($d\lambda/dt$) orders of magnitude larger than previously thought possible.

What is claimed is:

1. A continuous-wave dye laser having a tuner positioned at the mid-point of the laser cavity wherein the frequency of tuning of said tuner in cycles per second is made equal to the velocity of light c in centimeters per second divided by the optical length L of said cavity in centimeters.

2. A method for tuning a continuous-wave dye laser which includes continuously spatially changing the wavelength of the light wave propogating inside the cavity and thus achieving a substantial increase in tuning rate.

3. In a continuous-wave dye laser having a cavity optical path length L in centimeters, and a tuner having a tuning rate f in cycles per second, the improvement which comprises:
   means to position said tuner at the mid-point of said light path; and
   means to cause said tuning rate f in cycles per second to equal the velocity of light in centimeters per second divided by the optical path length of said cavity in centimeters.

4. A method for tuning a continuous-wave dye laser which comprises:
   placing a tuning element at the mid-point of the laser cavity light path; and
   causing the tuning rate f in cycles per second and the laser cavity optical path length L in centimeters to satisfy the equation $L = c/f$ where $c$ is the velocity of light in centimeters per second.

* * * * *